Wallace F. Wiley, Jr.
INVENTOR

BY
Kenway, Jenney & Hildreth
ATTORNEYS

United States Patent Office 3,538,507
Patented Nov. 3, 1970

3,538,507
SUPER-REGENERATIVE TARGET DETECTION SYSTEM
Wallace F. Wiley, Jr., Prairie Village, Kans., assignor to Bonzer Inc., Shawnee, Kans., a corporation of Kansas
Filed Oct. 31, 1968, Ser. No. 772,171
Int. Cl. F42c *11/00;* G01s *9/04*
U.S. Cl. 343—7.5           10 Claims

ABSTRACT OF THE DISCLOSURE

The radar apparatus disclosed herein employs a super-regenerative oscillator for detecting the presence of a target at a preselected range or distance. The operation of the oscillator is controlled by a monostable multi-vibrator switching circuit having two states, one being stable and the other being unstable. The oscillator and the multivibrator are interconnected in such a way that the proportion of time during which the multivibrator remains in its stable state varies as a function of the actual squeg rate of the oscillator. As the presence of the target at the predetermined range causes the squeg-rate of the oscillator to stabilize, a reduction in the random variation in the aforesaid proportion of time is indicative of the presence of the target.

BACKGROUND OF THE INVENTION

This invention relates to radar apparatus and more particularly to such apparatus employing a super-regenerative oscillator for detecting the presence of a target at a preselected range.

In a super-regenerative oscillator which periodically bursts into oscillations at a characteristic frequency, there is an interval occurring just prior to each burst of oscillations during which the operation of the oscillator is quite sensitive to disturbances at the characteristic frequency. The oscillator will thus function as a sensitive detector of received energy at the characteristic frequency during these intervals.

It has previously been known to employ a super-regenerative oscillator for radar purposes by utilizing the periodically generated bursts of oscillations provided by such an oscillator as the transmitted pulses and by employing the sensitive period preceding each such burst of oscillations for detecting reflected signals. The repetition rate of the oscillator, that is, the rate at which it repeats the bursts of oscillations, is usually referred to as the squeg rate. The squeg rate and, reciprocally, the squeg period can be generally varied or controlled by varying the biasing of the oscillator. However, at any nominal squeg rate, there is substantial random variation in the actual squeg rate or period unless a signal at the characteristic frequency is received during the sensitive periods. If a signal is received during these periods, the random variation or noise is substantially reduced. Thus, when the nominal squeg period generally corresponds to the distance to a wave reflecting target, the operation of the oscillator will be affected by the reception of reflected energy during the sensitive period of operation.

The squeg period corresponding to the target distance is a measure of the target distance. However, assuming the oscillator is allowed to run freely, the operation of the oscillator may indicate the presence of a target not only at the range corresponding to the actual squeg period but also at ranges corresponding to squeg periods which are integer multiples of the actual squeg period. This is caused by the fact that radio frequency energy reflected from a target or object at a substantial distance may return after an interval which is substantially equal to a multiple of the actual squeg period and thus be received during the sensitive portion of a squeg cycle which is more than one squeg period removed from the cycle which transmitted the energy. In other words, there is ambibuity latent in the indication provided by such a radar. For example, if such an oscillator is operated with a squeg period corresponding to a predetermined range of 300 feet, it may respond not only to targets at 300 feet, but also to targets at other longer ranges such as 700 feet and 1100 feet. It may be noted that these longer ranges are not integer multiples of one another due to the offset or slight delay between the sensitive portion of each squeg cycle of the oscillator and the portion during which the transmitted radio frequency energy is generated. While returns from longer ranges will typically be weaker than those reflected from a target at the preselected range, the response may be strong enough to cause difficulty in discrimination, particularly if the target is highly reflective.

Among the several objects of the present invention may be noted the provision of radar apparatus employing a super-regenerative oscillator which will detect the presence of a target at a preselected range without ambiguity; the provision of such apparatus which is highly reliable; and the provision of such apparatus which is relatively simple and inexpensive. Other objects and features will be in part apparent and in part pointed out hereinafter.

SUMMARY OF THE INVENTION

Briefly, radar apparatus of this invention is operative to detect the presence of a target at a preselected range. The apparatus employs a super-regenerative oscillator having a squeg rate which varies generally as a function of the bias applied thereto. The biasing of the oscillator is controlled by a switching circuit having a first state in which the oscillator is biased into super-regenerative oscillation at a squeg rate having a period which corresponds to the return time of a signal reflected from a target at the predetermined range. The switching circuit also has a second state in which the oscillator is biased out of oscillation, the switching circuit being operative to switch automatically from the second state to the first state after a substantially predetermined time interval in the second state, the time interval being substantially longer than the return time. Further, the switching circuit is responsive, after a predetermined delay following switching from the second state to the first states, to triggering signals applied thereto for switching from the first state to the second state. The oscillator is coupled to the switching circuit for applying a triggering signal thereto when the oscillator bursts into oscillation. Accordingly, the proportion of time during which the switching circuit remains in the first state varies as a function of the actual squeg rate of the oscillator and a reduction in the random variation in that proportion is indicative of the presence of a target at the predetermined range.

DESCRIPTION OF THE PREFERRED EMBODIMENT

Figure 1:
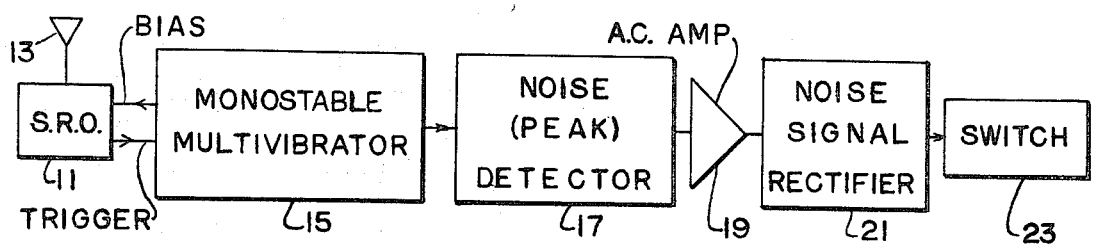
FIG. 1 is a block diagram of radar apparatus of this invention.

Referring now to the drawings, the apparatus illustrated is a fixed range altimeter suitable for controlling the opening of a supply drop parachute. In making supply drops from aircraft by parachute, it is highly desirable that the parachute not be opened until the package is relatively close to the ground so that drifting of the supply package with the parachute does not cause the package to be lost. Ordinary aneroid altimeters, however, are not sufficiently accurate to reliably provide chute opening at a predetermined, relatively low altitude and, in addition, must be compensated for the height of the land mass above sea level. The apparatus illustrated reliably provides an accurately timed parachute opening at a predetermined altitude without regard to the height of the land mass above sea level.

With reference to FIG. 1, a super-regenerative oscillator 11 is provided which bidirectionally coupled to an antenna 13. As will be apparent hereinafter, antenna 13 may in fact comprise at least a portion of the tuned circuit of the oscillator. As is understood by those skilled in the art, a super-regenerative oscillator such as that indicated at 11 will, when appropriately biased, periodically break into oscillations at a characteristic frequency. The rate at which the bursts of oscillations are repeated is typically referred to as the squeg rate and this rate is variable as a function of the biasing of the oscillator. The components of the oscillator are selected so that the periodically occurring oscillations are at a characteristic frequency, e.g., 400 megacycles, which is appropriate for radar purposes in the intended application.

The biasing of oscillator 11 is controlled by a monostable or single-shot multivibrator 15 which switches a bias signal applied to the oscillator between two different levels. As is understood by those skilled in the art, such a multivibrator is a switching type circuit having two distinct states, one of which is stable and the other of which is unstable. When the circuit is at rest in its stable state, a triggering signal applied thereto will cause it to switch to its unstable state. Once triggered, the circuit will remain in the unstable state for a predetermined time interval and then revert automatically to the stable state. For a relatively brief period or delay following the reversion to the stable state, the multivibrator circuit is substantially insensitive to triggering signals. The bias level produced during the stable state is selected to provide a squeg rate having a period corresponding to the predetermined range at which it is desired to detect the presence of a target. The bias level corresponding to the unstable state is selected to completely cut off or prevent oscillations.

When the oscillator 11 bursts into oscillation as described previously, a signal is generated which is coupled to the multivibrator circuit 15 and is employed as a trigger signal to switch the multivibrator from its stable to its unstable state. As was noted previously, the multivibrator circuit 15 is relatively insensitive to triggering signals for a relatively brief period following each reversion from the unstable to the stable state. Accordingly, the first burst of oscillations following reversion to the stable state does not trigger the switching circuit but the second burst does. The mutlivibrator circuit therefore remains in its stable circuit for a period which is approximately equal to one squeg period. It can thus be seen that the multivibrator switching circuit operates in a cycle in which the two states of the circuit alternate. The unstable state lasts for a period which is determined by the characteristics of the multivibrator circuit and the stable state lasts for a period which varies as a function of the actual squeg period or squeg rate of the oscillator 15. In other words, the proportion of time which the multivibrator switching circuit spends in the stable state varies as a function of the actual squeg period of the oscillator.

As was also noted previously, the squeg period of the oscillator 11 is stabilized when a signal at the characteristic frequency is received during the sensitive period in its operation, e.g. if there is a reflective target at the preselected range corresponding to the predetermined squeg period. Otherwise, the squeg period exhibits a random variation in length from cycle to cycle. Stabilization of the squeg period in turn stabilizes the proportion of time which the multivibrator switching circuit spends in its stable state. It can thus be seen that a reduction in the random variation of the proportion of time spent in the stable state is indicative of a target at the predetermined range.

As is explained in greater detail hereinafter, the multivibrator circuit 15 is operated to provide a pulsating signal having a peak value which varies as a function of the length of time spent in the stable state. The peak value is sensed by a peak detector 17. As the squeg period and the proportion of time spent in the stable state vary randomly in the absence of a reflected signal, this peak value will vary correspondingly and this variation in value may be considered to be noise. Since the squeg period is stabilized when a reflected signal is received, it can be seen that the amplitude of the noise signal will be substantially reduced when a target is present at the predetermined range.

The A.C. component of the signal provided by detector 17 i.e., the noise signal, is amplified in an A.C. amplifier as indicated at 19 and is then rectified as indicated at 21 to provide a D.C. signal which varies generally as a function of the noise signal amplitude. This signal changes level when a reflected signal is received and thereby indicates the presence of a target at the preselected range. This D.C. signal in turn operates a switching circuit 23 which can control any desired operation, e.g., the releasing of a parachute.

Figure 2:
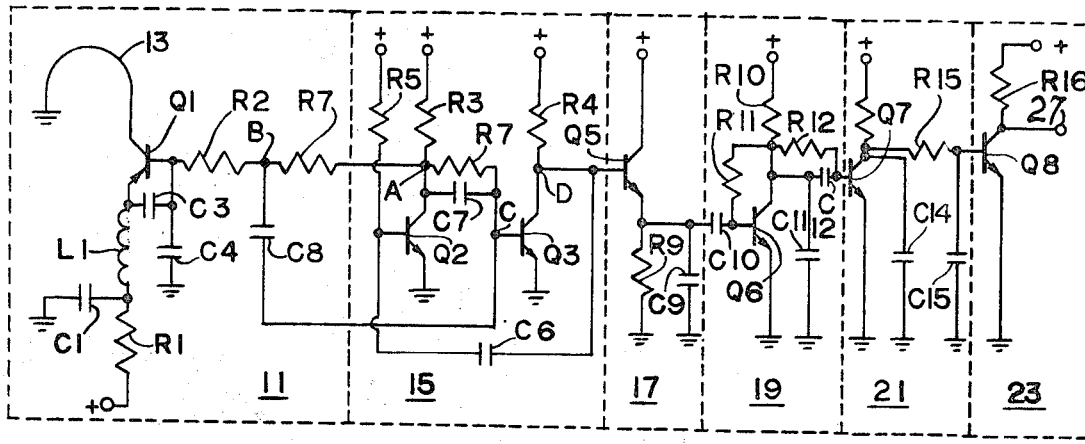
FIG. 2 is a schematic circuit diagram of the radar apparatus of FIG. 1.

Particular circuitry providing the operation just described generally is illustrated in FIG. 2, a suitable positive supply voltage being provided at each point in the circuit indicated by a (+) sign. The entire circuit of FIG. 2 including the antenna 13, may conveniently be constructed as an integral assembly on a single circuit board. The antenna 13 may, for example, comprise a partial loop formed by a conductor following the periphery of one end of the circuit board. The loop antenna forms a tuned collector circuit for a high-frequency PNP transistor Q1. Positive current is provided to the emitter of transistor Q1 through a current limiting resistor R1 and a high-frequency choke L1, radio frequency bypassing being provided by a capacitor C1. Regenerative feedback is provided by an A.C. voltage divider constituted by the collector-emitter capacitance of the transistor Q1 and a capacitor C3, radio frequency bypassing at the base being provided by a capacitor C4. A biasing signal can be applied to an oscillator transistor Q1 through a resistor R2 which is of relatively low value. Oscillator 11 operates in a super-regenerative mode and breaks into oscillations at its characteristic frequency at a repetition or squeg rate which depends upon the biasing applied through resistor R2 to transistor Q1.

The monostable multivibrator 15 comprises a pair of NPN transistor Q2 and Q3 which are provided with respective collector load resistors R3 and R4. The collector or output terminal of transistor Q2 is coupled to the base or input terminal of transistor Q3 through a capacitor C7 and a resistor R7 connected parallel so that transistor Q3 conducts when transistor Q2 is cut off and is cut off when transistor Q2 conducts. The collector or output terminal of transistor Q3 is coupled to the base or input terminal of transistor Q2 through a capacitor C6. Bias or timing current is provided to the junction between capacitor C6 and the base of the transistor Q2 through a resistor R5. Accordingly, transistor Q2 will be cut off for a predetermined interval after transistor Q3 is triggered into conduction and, after this interval, will return to the conductive state.

As is understood by those skilled in the art, the transistors Q2 and Q3 operate as switching devices and the monostable multivibrator circuit 15 has a first or stable state in which transistor Q2 conducts and transistor Q3 is cut off and a second or unstable state in which transistor Q3 conducts and transistor Q2 is cut off. Circuit 15 may be switched into its unstable state by pulses of the appropriate polarity applied to the input or base terminal of either transistor. The circuit will then remain in its unstable state for a period determined by the relative values of capacitor C6 and resistor R5. In the apparatus illustrated, these values are selected so that the unstable state has a period which is substantially longer than the return time of R.F. energy reflected from a target at the preselected range, e.g., the unstable state may have a period in the order of 25 microseconds. At the end of this period, the multivibrator circuit automatically returns to its first or stable state. Due to the presence of capacitor C7, the multivibrator circuit 15 is relatively insensitive to triggering pulses for a brief interval following its return to the stable state.

The multivibrator circuit 15 controls the biasing of oscillator 11 by means of a resistor R7 which connects the collector of the transistor Q2, designated junction A, to the base circuit of the oscillator transistor Q1. When transistor Q2 is cut off, the oscillator 11 is biased out of oscillation. However, when transistor Q2 is conducting, biasing current flowing through resistor R7 biases the oscillator into super-regenerative oscillation. The value of resistor R7 is selected so that the preselected squeg period resulting corresponds to the preselected range at which it is desired to detect the presence of a target. As an example, the preselected range may be assumed to be 300 feet and the corresponding preselected squeg period is then about 0.8 microsecond.

When the oscillator 11 bursts into oscillation, a positive-going wavefront is generated at the junction between resistors R2 and R7, this point being designated as junction B in FIG. 2. This positive-going pulse is coupled, through a capacitor C8, to the base of multivibrator transistor Q3 and operates as a triggering signal for switching the multivibrator circuit 15 into its unstable state. The base of transistor Q3 is designated junction C.

Figure 3:
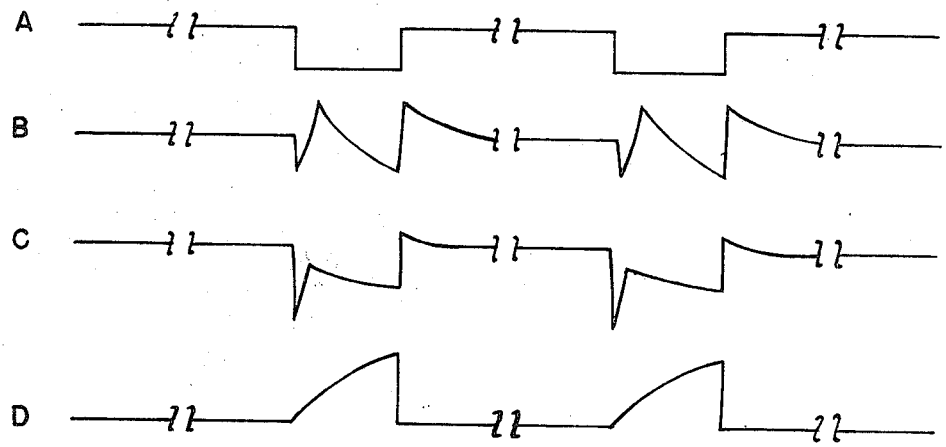
FIG. 3 represents waveforms occurring at various points within the circuit of FIG. 2.
Corresponding reference characters indicate corresponding parts throughout the several views of the drawings.

Briefly then, the operation of the oscillator 11 in conjunction with the multivibrator circuit 15 is as follows. When the multivibrator is in its stable state, biasing current is applied to the oscillator through resistor R7 so that the oscillator bursts into super-regenerative oscillation. The positive-going pulse generated at junction B as a result of oscillator 11 bursting into oscillation is applied to the base of transistor Q3, thereby switching the multivibrator circuit into its unstable state. This unstable state lasts for the period determined by resistor R5 and capacitor C6 and the circuit then automatically returns to its stable state. Upon the return to the stable state, biasing current is again applied to oscillator 11 so that it again begins to operate in a super-regenerative mode. However, since the multivibrator is relatively insensitive to triggering signals for a brief period following the return to the stable state, the second burst of oscillations triggers the multivibrator rather than the first. Accordingly, the multivibrator circuit 15 remains in the stable state for an interval which is approximately equal to one squeg period, that is, it remains in its stable state long enough to produce two successive bursts of oscillations. The waveforms generated at junctions A, B and C are represented in the corresponding designated lines in FIG. 3. A similar mode of operation may be obtained by using the squeg signal to synchronize an unstable multivibrator in which both states of the circuit are unstable.

The relative values of resistor R4 and capacitor C6 are selected to provide a time constant which is on the same order of magnitude as the preselected squeg period. Accordingly, the voltage to which capacitor C6 is recharged while the multivibrator circuit 15 is in its stable state will depend upon the actual squeg period at which oscillator 11 is operating. In other words, a time-to-voltage conversion is provided at the collector of the transistor Q3. The collector of transistor Q3 is designated junction D in FIG. 2 and the corresponding waveform is represented at line D in FIG. 3.

The collector of transistor Q3 is connected to the base of an NPN transistor Q5 which comprises the noise detector 17. The emitter of transistor Q5 is connected to ground through a resistor R9 and this resistor is shunted by a capacitor C9. The time constant of resistor R9 and capacitor C9 is selected so that the transistor Q5 operates as a peak detector, that is, the base-emitter junction of transistor Q5 rectifies the waveform represented at line D of FIG. 3. Since the multivibrator circuit 15 performs a time-to-voltage conversion as explained previously, it can be seen that the voltage to which capacitor C9 is charged constitutes a signal representing the proportion of time which multivibrator 15 spends in its stable state.

A.C. components of the signal voltage provided across capacitor C9 are applied, through a capacitor C10, to the base of an NPN transistor Q6 for amplification. Transistor Q6 is provided with a collector load resistor R10 and its base circuit is biased from the collector circuit through a resistor R11 for substantially linear operation. The collector circuit of transistor Q6 is bypassed by a capacitor C11 for suppressing very high frequency components in the amplified signal. The amplified A.C. signal is applied, through a capacitor C12, to the base of an NPN transistor Q7. The collector of transistor Q7 is shunted by a capacitor C14 for suppressing relatively high frequency components. Transistor Q7 is strongly biased from the collector of transistor Q6 through a resistor R12 so that it is normally saturated and therefore operates to rectify the A.C. signal applied to its base terminal. In other words, the collector of transistor Q7 will remain substantially at ground potential when there is no significant A.C. component in the signal generated across capacitor C9 and will show a positive-going rectified signal when there is such a component. This rectified A.C. is filtered by means of a resistor R15 and a capacitor C15.

The voltage developed across capacitor C15 is applied to the switching circuit 23 which simply comprises an NPN transistor Q8 provided with a collector load resistor R16, the capacitor voltage being applied to the base of transistor Q8. An output terminal 27 is connected to the collector of transistor Q8. When the transistor Q8 is cut off, the output terminal 27 is held at the positive source potential but when the voltage on capacitor C15 reaches a predetermined threshold equal to the base-emitter offset voltage of transistor Q8, the transistor turns on thereby pulling the terminal 27 substantially to ground potential.

When this apparatus is employed as an altimeter for parachute supply drops, the indication signal provided at the terminal 27 may be employed to trigger the release of the parachute thereby to cause the parachute to open at a predetermined altitude with respect to the actual ground level. The physical release of the parachute is accomplished by means which form no part of the present invention and are thus not described in detail herein, although it may be noted that, in one construction, the indication signal is employed to trigger an SCR which in turn fires a squib providing the mechanical release of the parachute.

The way in which this apparatus operates to detect the presence of a traget at the preselected range is substantially as follows. The oscillator 11 and the multivibrator 15 interact as explained previously to cause the oscillator to generate pulses or bursts of oscillations in pairs. When no target is present, the squeg period of the oscillator circuit 11 will vary a small amount in a random manner. This random variation may be considered to be noise of the type usually associated with super-regenerative receivers when no signal is being received. The random time variation in squeg period is converted into a pulse height variation at the collector of multivibrator transistor Q3 by the interaction of the oscillator and the multivibrator 15 as explained previously and this pulse height variation produces a substantial A.C. component in the signal generated across capacitor C9. This A.C. component, when it is amplified and then rectified, causes transistor Q8 to conduct and to thereby maintain the output terminal 27 substantially at ground potential. This condition indicates the absence of a target at the preselected range.

On the other hand, when a target is present at the preselected range, energy transmitted during the first pulse in each pair will be reflected from the target and arrive back at the antenna 13 just in time to arrive during the sensitive period in the cycle of operation of the oscillator 11. This received energy stabilizes the squeg period of oscillator 11. Accordingly, there will then be very little variation in the peak votlages developed at the collector of transistor Q3 and thus the signal voltage provided across capacitor C9 will not have any substantial A.C. component. Accordingly, the collector of transistor Q7 will remain substantially at ground potential, the transistor Q8 will be turned off, and a positive going signal will be provided at the terminal 27, this signal being indicatve of the presence of a target at the preselected range.

Since bursts of oscillations are provided only in pairs under the control of multivibrator switching circuit 15 and since the successive pairs are separated by an interval which is quite long relative to the desired return time, it can be seen that R.F. energy radiated by the bursts in one full cycle of operation of the multivibrator would be so attenuated as to be undetectable during a subsequent cycle. Accordingly, ambiguous responses are eliminated.

In view of the above, it will be seen that the several objects of the present invention are achieved and other advantageous results are attained.

As various changes could be made in the above constructions without departing from the scope of the invention, it is intended that all matter contained in the above description or shown in the accompanying drawings shall be interpreted as illustrative and not in a limiting sense.

What is claimed is:

1. Radar apparatus for detecting the presence of a target at a preselected range, said apparatus comprising:
  a super-regenerative oscillator having a squeg rate which varies as a function of the bias applied thereto;
  a switching circuit for controlling the biasing of said oscillator, said switching circut havng a first state in which said oscillator is biased into super-regenerative oscillation at a squeg rate having a period which corresponds to the return time of a signal reflected from a target at said preselected range, said switching circuit being operative to switch automatically from a second state to said first state after a substantially predetermined time interval in said second state, said time interval being substantially longer than said return time, said switching circuit being responsive, after a predetermined delay following switching from said second state to said first state, to triggering signals applied thereto for switching from said first state to said second state; and
  means for coupling said oscillator to said switching circuit for applying a triggering signal to said switching circuit when said oscillator bursts into oscillation thereby to cause the proportion of time during which said switching circuit remains in said first state to vary as a function of the actual squeg rate of said oscillator, a reduction in the random variation in said proportion of time being indicative of the presence of a target at said preselected range.

2. Apparatus as set forth in claim 1 including means for providing an indication signal when the random variation in said proportion of time falls below a preselected level.

3. Apparatus as set forth in claim 2 wherein said switching circuit includes means providing a pulsating signal having a peak amplitude which varies as a function of the time spent in said first state.

4. Apparatus as set forth in claim 3 wherein said means for providing an indication signal includes means for detecting variations in said amplitude peaks.

5. Apparatus as set forth in claim 3 include a peak detector and means for detecting the A.C. component of the output signal provided by said peak detector.

6. Apparatus as set forth in claim 1 wherein said switching circuit comprises a multivibrator having at least one unstable state.

7. Radar apparatus for detecting the presence of a target at a preselected range, said apparatus comprising:
  a super-regenerative oscillator having a squeg rate which varies as a function of a bias signal applied to said oscillator;
  a multivibrator circuit including a pair of switching devices each having an input terminal and an output terminal, a respective load resistance for the output terminal of each of said devices, a first means coupling the output terminal of one of said devices to to the input terminal of the other of said devices for causing said other device to conduct when said one device is cut off and to be cut off when said one device conducts and a second means coupling the output terminal of said other device to the input terminal of said one device, said second means including a capacitor and means for discharging said capacitor at a predetermined rate thereby to cause said one device to be cut off for a predetermined time interval after said other device starts to conduct and to then automatically resume conduction, the time constant of the load resistance for said other device and said capacitor being in the same order of magnitude as the return time of a signal reflected from a target at said preselected range;
  means for biasing said oscillator into super-regenerative oscillation at a squeg rate having a period which corresponds to the return time of a signal reflected from a target at said preselected range when said one device conducts and for biasing said oscillator out of oscillation when said one device is cut off;
  means for applying a triggering signal to said multivibrator circuit for triggering said other device into conduction when said oscillator circuit bursts into oscillation, said multivibrator circuit being insensitive to said triggering signals for a brief period following resumption of conduction of said one device, whereby the proportion of time during which said one device conducts and the peak voltage at the output terminal of said other device vary as functions of the actual squeg rate of said oscillator circuit when biased into oscillation; and
  means for providing a signal indicating the presence of a target at said preselected range when the amplitude of the variation in said peak voltage falls below a predetermined level.

8. Apparatus as set forth in claim 7 wherein said switching devices are transistors having collector output terminals and base input terminals.

9. Apparatus as set forth in claim 7 wherein said first means includes a capacitor which renders said multivibrator circuit relatively insensitive to triggering signals for a relatively brief period following initiation of conduction in said one device.

10. Radar apparatus for detecting the presence of a target at a preselected range, said apparatus comprising;
  a super-regenerative oscillator having a squeg rate which varies as a function of a bias signal applied to said oscillator;
  a monostable multivibrator including first and second transistors, a load resistor for the collector of each transistor, a resistor and a capacitor in parallel connecting the collector of said first transistor to the base of said second transistor, a timing capacitor connecting the collector of said second transistor to the base of said first transistor, the time constant of said timing capacitor with the load resistor for said second transistor being generally of the same order of magnitude as the return time of a signal reflected from a target at said preselected range, a timing resistance for discharging said timing capacitor and normally biasing said first transistor into conduction, the time constant of said timing capacitor with said timing resistance being substantially greater than said return time;

means for biasing said oscillator into super-regenerative oscillation at a squeg rate having a period which corresponds to the return time of a signal reflected from a target at said preselected range when said first transistor conducts and for biasing said oscillator out of oscillation when said first transistor is cut off;

means for applying a triggering signal to said multivibrator circuit for triggering said second transistor into conduction when said oscillator circuit bursts into oscillation, said multivibrator circuit being insensitive to said triggering signals for a brief period following initiation of conduction of said first transistor, thereby to cause the peak voltage at the collector of said second transistor to vary as a function of the actual squeg rate of said oscillator circuit when biased into oscillation;

means for providing a noise signal which varies in response to variations in the value of said peak voltage; and means for providing a signal indicating the presence of a target at said preselected range when the A.C. component of said noise signal falls below a predetermined level.

References Cited

UNITED STATES PATENTS

| | | | |
|---|---|---|---|
| 2,975,414 | 3/1961 | Bogle | 343—13 |
| 2,980,905 | 4/1961 | Gratian et al. | |
| 2,984,833 | 5/1961 | Nieset et al. | |
| 3,329,952 | 7/1967 | Bogle | 102—70.2 X |

RICHARD A. FARLEY, Primary Examiner

M. F. HUBLER, Assistant Examiner

U.S. Cl. X.R.

102—70.2; 325—428; 343—7, 13